United States Patent [19]

Hofmann et al.

[11] 4,329,849

[45] May 18, 1982

[54] METHOD AND APPARATUS FOR REPLENISHING THE HELIUM BATH IN THE ROTOR OF A SUPERCONDUCTING GENERATOR

[75] Inventors: Albert Hofmann, Karlsruhe; Christoph Schnapper, Erlangen, both of Fed. Rep. of Germany

[73] Assignee: Kernforschungszentrum Karlsruhe Gesellschaft mit beschränkter Haftung, Karlsruhe, Fed. Rep. of Germany

[21] Appl. No.: 157,807

[22] Filed: Jun. 9, 1980

[51] Int. Cl.³ .............................................. F17C 7/02
[52] U.S. Cl. ........................................ 62/55; 62/505; 165/89; 310/54; 310/64
[58] Field of Search ...................... 62/55, 505, 514 R; 165/89; 310/54, 64

[56] References Cited

U.S. PATENT DOCUMENTS

| | | | |
|---|---|---|---|
| 3,989,102 | 11/1976 | Jaster et al. | 310/54 |
| 4,000,777 | 1/1977 | Laing | 165/86 |
| 4,048,529 | 9/1977 | Pomeroy et al. | 310/54 |
| 4,056,745 | 11/1977 | Eckels | 310/52 |
| 4,082,967 | 4/1978 | Laskaris | 310/64 |

OTHER PUBLICATIONS

Bejar, A., "Improved Thermal Design of the Cooling System for a Superconducting Synchronous Generator", MIT Thesis (Dec. 1974).

Hoffman, A. et al, "Thermodynamics of a Self-Pumping Cooling Cycle for Superconducting Generator Applications", *Cryogenics*, Jul. 1977, pp. 429–433.

*Primary Examiner*—Ronald C. Capossela
*Attorney, Agent, or Firm*—Spencer & Kaye

[57] ABSTRACT

In order to replenish a helium bath in the super-conducting rotor of an electrical machine, in which bath liquid helium boils at subatmospheric pressure, with liquid helium from a helium reservoir, the liquid helium in the reservoir being at ambient pressure and a part of the liquid helium changing to the vapor phase during flow from the reservoir to the bath, liquid helium is introduced into the bath at a distance from the rotor axis of rotation, the liquid and vapor phases of the helium flowing from the reservoir to the bath are separated from one another in a phase separator fixed to the rotor, and the separated vapor phase is extracted from the separator.

2 Claims, 2 Drawing Figures

METHOD AND APPARATUS FOR REPLENISHING THE HELIUM BATH IN THE ROTOR OF A SUPERCONDUCTING GENERATOR

BACKGROUND OF THE INVENTION

The present invention relates to a method and an apparatus for replenishing the helium bath of a superconducting generator with liquid helium from a helium reservoir under ambient pressure, the helium bath boiling at subatmospheric pressure and part of the helium changing to the vapor phase while flowing from the reservoir to the bath. The liquid phase of the helium is fed into the helium bath at a distance from the axis of rotation.

In order to attain high reliability in the operation of electrical machines employing rotating superconducting excitation windings, it is considered necessary to feed in the liquid helium in such a manner as to assure that operation of the generator is not interfered with even if there is a malfunction in the cooling system. This "decoupling" of the electrical machine from the cooling system is assured in a simple manner by connecting a reservoir for liquid helium therebetween. The pressure in this reservoir is preferably atmospheric or, in order to prevent impurities in the surrounding atmosphere from contaminating the liquid helium, slightly above atmospheric.

In order to obtain a high current density, the superconducting rotor winding is advisably cooled with helium which boils at a reduced pressure of a few tenths of a bar and thus has a boiling temperature of $T < 4.2°$ K. This subatmospheric pressure in the rotor can be maintained in a simple manner by appropriately conducting the exhaust gas stream, taking into account that after absorbing heat, the waste gas leaves the rotor at atmospheric pressure so that additional pumps to produce the subatmospheric pressure in the cold part of the rotor are not necessary.

It has already been proposed, as described by A. Bejan in the work "Improved Thermal Design of the Cryogenic Cooling System for a Superconducting Synchronous Generator", Thesis MIT (1974), and U.S. Pat. No. 4,056,745 to expand the incoming helium through a choke valve to the subatmospheric pressure existing in the rotor, i.e., to effect a Joule-Thomson expansion. The valve must be actively regulated in dependence on the helium stream required in the rotor.

In other proposals, as disclosed in U.S. Pat. Nos. 4,048,529 and 4,082,967, it is assumed that the helium flowing into the rotor, due to thermal losses in the transfer line, has a relatively large vapor phase component. The rotating feeder line is designed in such a manner that the liquid and vapor phases are spatially separated, at least in the radially oriented part of the feeder line. The radial pressure variation in this feeder line is determined by the rotation-dependent compression of the vapor. This line opens into the liquid, which boils at subatmospheric pressure, at that point where its hydraulic pressure is equal to that of the pressure in the vapor column. This replenishing system is self-regulating as long as the vapor phase component does not become too small. In order to assure safe operation even with a large helium flow, it is contemplated to generate the necessary vapor component, if required, by heating the transfer line.

Another method is disclosed in "Cryogenics" 14,429 (1977). Here a liquid is fed through a radial feeder line and is fed into the helium, which boils at subatmospheric pressure, at the point where the hyraulic pressures are equal. One drawback is that the radius at which the feeding takes place is greater than when feeding in a vapor-liquid mixture. For a 50 Hz rotor, for example, this radius must be larger than 0.33 m. A further drawback is that only pure liquid is conveyed through the radial feeder line.

SUMMARY OF THE INVENTION

It is an object of the present invention to make it possible to replenish a helium bath which boils under reduced pressure independently of the vapor component of the helium to be fed in and also independently of the size of the rotor to be supplied.

This and other objects are achieved according to the invention in a method for replenishing a helium bath in the superconducting rotor of an electrical machine, in which bath liquid helium boils at subatmospheric pressure, with liquid helium from a helium reservoir, the liquid helium in the reservoir being at ambient pressure and a part of the liquid helium changing to the vapor phase during flow from the reservoir to the bath, which method includes introducing liquid helium into the bath at a distance from the rotor axis of rotation, by separating the liquid and vapor phases of the helium flowing from the reservoir to the bath in a phase separator fixed to the rotor, and extracting the separated vapor phase from the separator.

DESCRIPTION OF THE PREFERRED EMBODIMENT

Figure 1:
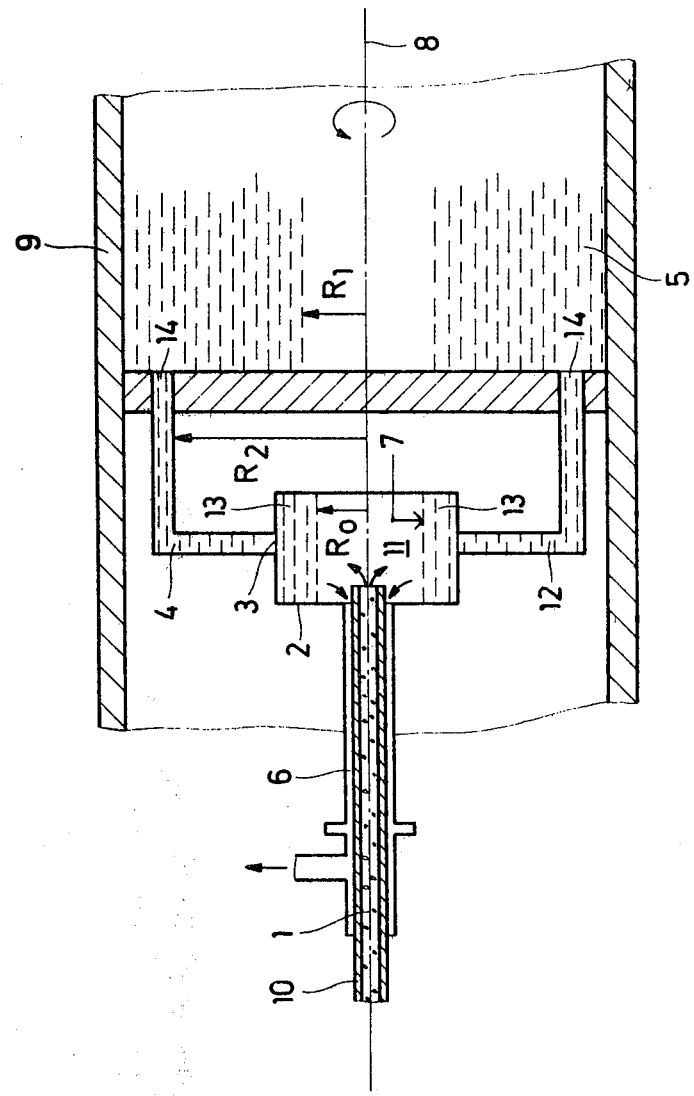
FIG. 1 is a simplified cross-sectional view of a preferred embodiment of apparatus for carrying out the invention.

In the generator system shown in FIG. 1, liquid helium delivered from a helium reservoir tank (not shown) where it is under pressure $p_0$ ($\approx 1$ bar), flows through a stationary line 1 which is insulated by a vacuum jacket 10, and flows into a phase separator 2 connected with the generator rotor 9. The phase separator 2 is essentially composed of a branching member 11 for one or several pipe lines 4 and 12 each communicating with the interior of member 11 via a peripheral output 3 thereof. Due to the rotation of separator 2 about the axis of rotation 8, with which the phase separator 2 is concentric, the vapor phase component present in the supply line 1 is separated from the liquid so that the liquid collects in a region 13 along the periphery of the separator. If the rate of rotation is sufficiently high, separation can also take place if the rotor axis is disposed horizontally. For example, the centrifugal acceleration at the rate of rotation of a 50 Hz synchronous generator at a distance of 1 cm from its axis is already 100 times greater than the acceleration due to gravity.

The liquid is conducted through line 4 and/or line 12 into the helium bath 5 to be supplied. The helium in bath 5 boils in the vicinity of the axis of rotation 8 at a pressure $p_1$ which is less than $p_0$ and the interface between the liquid bath and the vapor phase in the rotor is located at a distance $R_1$ from axis 8.

The vapor generated in the phase separator itself is discharged from the phase separator 2, through a coaxial outer line 6 surrounding jacket 10. The radius $R_0$ of the vapor/liquid interface in vapor chamber 11 of the phase separator 2 is kept at a given value by a level controller 7 which includes a level sensor. The liquid level in the phase separator 2 must be regulated actively. Such level controllers are sufficiently well known in the art. For example, temperature dependent measuring sensors such as carbon resistance thermometers for superconducting detectors can be used, as level controller 7. Level adjustments can be effected either by varying the pressure in the helium reservoir or by varying the pressure at the vapor outlet of line 6. This is the same technique as used in nonrotary systems.

In the bath 5 to be replenished, the phase interface $R_1$ assumes a radial position such that at the input point or points 14 the same pressure exists in lines 4 and 12 as in the helium bath 5. Input point or points 14 are located at a distance $R_2$ from axis 8.

Figure 2:
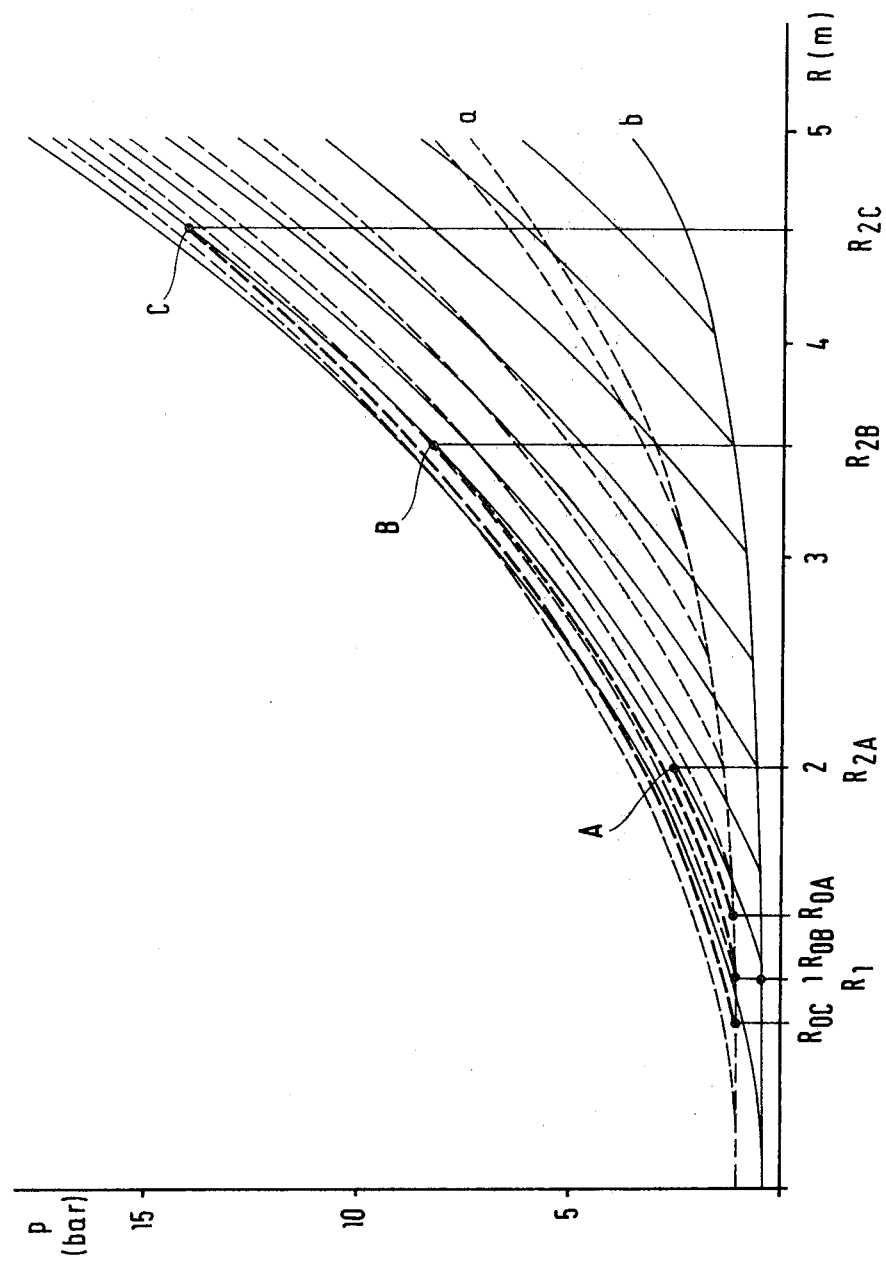
FIG. 2 is a diagram illustrating the operation of the invention.

FIG. 2 illustrates pressure changes in the radial lines 4 and 12, which could be replaced by a cylindrical feeder line, and in the helium bath 5 in dependence on the distance R from the axis of rotation 8 and in dependence on the radial positions $R_0$ and $R_2$ of the phase interfaces. There is shown by way of example typical conditions in a large superconducting turborotor 9 rotating at 50 Hz and measuring 1 m diameter. Along the axis 8 of the rotor 9, there is assumed to exist a pressure of 0.41 bar such as may develop, for example, in the discharge circuit due to the self-pumping effect.

The broken-line curve a represents the vapor phase pressure variation as a function of distance from axis 8 for an axial pressure $p_0 = 1$ bar, as it exists in separator 2, while the solid curve b represents the corresponding vapor phase pressure variation for an axial pressure $p_1 = 0.41$ bar, as it exists in bath 5. The steeper curves branching upwardly from curves a and b illustrate corresponding liquid phase pressure variations as a function of distance R from the axis 8. Each liquid phase curve represents the liquid phase pressure variation when the radial position of the liquid/vapor interface corresponds to the abscissa value of the point of intersection of that liquid phase curve with its associated vapor phase curve. These groups of curves indicate the limits within which the radii $R_0$, $R_1$ and $R_2$ can be varied.

To show within which region the vapor and feeder radii can be varied, FIG. 2 shows three examples. In each, the requirement is that a vapor radius of $R_1 = 0.1$ m develop in the helium bath 5. This means that the liquid phase pressure in bath 5 follows curve b' which intersects curve b at $R_1 = 0.1$ m. Thus, if input point or points 14 are located, in respective embodiments, at a distance of $R_{2A} = 0.2$ m, or $R_{2B} = 0.35$ m, or $R_{2C} = 0.45$ m, the vapor/liquid interface in separator 2 must be spaced from axis 8 by the corresponding radial distance $R_{0A}$, or $R_{0B}$, or $R_{0C}$, where the liquid phase curves associated with curve a and starting at points $R_{0A}$, $R_{0B}$ and $R_{0C}$ intersect liquid phase curve b'.

In the calculation which leads to the result described in FIG. 2, it must be considered that the thermodynamic state of the helium changes considerably during compression due to centrifugal acceleration. No heat is added to or removed from the helium in the feeder lines 4 and/or 12. That means that these lines must preferably be made of a material having poor heat conducting properties, e.g. stainless steel. The increase in pressure in the single-phase liquid is calculated from the change in the state relation $$h(R) - h(o) = \tfrac{1}{2}\omega^2 R^2 \tag{1}$$

and from s = constant where $h(0)$ and $h(R)$ are the specific enthalpies along the axis and at radius R, respectively, $\omega$ is the rate of rotation in radians/sec., and s the specific entropy. In the state diagram, the vapor is compressed along the phase interface so that the vapor pressure at the interface is given by:

$$\int_{p(r_o)}^{p(r_1)} \frac{1}{\rho_s} dp = \tfrac{1}{2} \cdot \omega^2 (r_1^2 - r_o^2) \tag{2}$$

where $\rho_s$ is the density of the saturated vapor, $r_1$ is the radius of the phase interface ($= R_1$), $r_o$ is the radius at the vapor outlet from the bath ($\approx o$), and $p(r_1)$ and $p(r_o)$ are the corresponding pressures.

The relationships (1), (2) and (3) can also be verified experimentally. The significant advantages of the invention are that the liquid and the vapor of the inflowing helium are separated in a phase separator 2 which is integrated with the rotor 9. The liquid is fed into the rotor 9 at a suitable location 4 and/or 12 and the vapor is returned through a separate line 6. The point of feeding-in 4 and/or 12 can be selected freely within wide limits. The system operates independently of the magnitude of the vapor content in the helium. This results in the further advantages of operational reliability, adaptability to various rotor designs and the clear separation of liquid and vapor.

It will be understood that the above description of the present invention is susceptible to various modifications, changes and adaptations, and the same are intended to be comprehended within the meaning and range of equivalents of the appended claims.

What is claimed is:

1. In a method for replenishing a helium bath in the superconducting rotor of an electrical machine, in which bath liquid helium boils at subatmospheric pressure, with liquid helium from a helium reservoir, the liquid helium in the reservoir being at ambient pressure and part of the liquid helium changing to the vapor phase during flow from the reservoir to the bath, which method includes introducing liquid helium into the bath at a distance from the rotor axis of rotation, the improvement comprising separating the liquid and vapor phases of the helium flowing from the reservoir to the bath in a phase separator fixed to the rotor, and extracting the separated vapor phase from the separator, and wherein said step of introducing is carried out by conducting only the liquid phase from the separator to the bath.

2. Method as defined in claim 1 wherein said step of introducing is carried out by introducing the liquid helium into the bath at a location which is further from the axis of rotation of the rotor than the liquid/vapor interface of the bath.

* * * * *